(12) United States Patent
McFadyen

(10) Patent No.: US 8,773,793 B1
(45) Date of Patent: Jul. 8, 2014

(54) DISK DRIVE SELECTING TARGET RESPONSE BASED ON IDENTIFIED RESPONSE

(75) Inventor: James P. R. McFadyen, Redwood City, CA (US)

(73) Assignee: Western Digital Technologies, Inc., Irvine, CA (US)

(*) Notice: Subject to any disclaimer, the term of this patent is extended or adjusted under 35 U.S.C. 154(b) by 34 days.

(21) Appl. No.: 13/566,910

(22) Filed: Aug. 3, 2012

(51) Int. Cl.
*G11B 5/09* (2006.01)

(52) U.S. Cl.
USPC .................................. 360/41; 360/39; 360/65

(58) Field of Classification Search
USPC .................. 360/41, 39, 65, 31, 40, 48, 49
See application file for complete search history.

(56) References Cited

U.S. PATENT DOCUMENTS

| | | | | |
|---|---|---|---|---|
| 4,458,362 A | * | 7/1984 | Berkovitz et al. | 381/103 |
| 4,949,168 A | * | 8/1990 | Ninomiya et al. | 348/605 |
| 5,341,249 A | * | 8/1994 | Abbott et al. | 360/46 |
| 5,381,359 A | * | 1/1995 | Abbott et al. | 708/322 |
| 5,691,857 A | * | 11/1997 | Fitzpatrick et al. | 360/77.06 |
| 6,055,119 A | * | 4/2000 | Lee | 360/51 |
| 6,160,673 A | * | 12/2000 | Izumi et al. | 360/46 |
| 6,995,933 B1 | * | 2/2006 | Codilian et al. | 360/46 |
| 7,185,269 B2 | | 2/2007 | Mar et al. | |
| 7,298,570 B1 | * | 11/2007 | Han | 360/65 |
| 7,424,074 B2 | | 9/2008 | Lee et al. | |
| 7,440,208 B1 | | 10/2008 | McEwen et al. | |
| 7,898,756 B1 | | 3/2011 | Wang | |
| 7,917,563 B1 | | 3/2011 | Shih et al. | |
| 2004/0100714 A1 | * | 5/2004 | Berman et al. | 360/65 |
| 2006/0245757 A1 | * | 11/2006 | Elahmadi et al. | 398/135 |
| 2011/0093517 A1 | | 4/2011 | Liu et al. | |
| 2011/0110210 A1 | | 5/2011 | Honma | |

OTHER PUBLICATIONS

Wikipedia, "Similarities between Wiener and LMS", Feb. 4, 2012, http://en.wikipedia.org/wiki/Similarities_between_Wiener_and_LMS, 3 pages.

* cited by examiner

*Primary Examiner* — Tan X Dinh

(57) ABSTRACT

A disk drive is disclosed comprising a head actuated over a disk. A test pattern is written to the disk and read from the disk to generate a read signal. The read signal is sampled to generate signal samples, the signal samples are filtered with an equalizer filter to generate a first output, and the test pattern is filtered with a target filter to generate a second output. An error signal is generated based on a difference between the first output and the second output. Coefficients of the target filter are adapted in response to the error signal, and after adapting the coefficients of the target filter, a sequence detector is configured based on the coefficients of the target filter.

18 Claims, 5 Drawing Sheets

US 8,773,793 B1

DISK DRIVE SELECTING TARGET RESPONSE BASED ON IDENTIFIED RESPONSE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

Data is typically written to data sectors within a data track by modulating the write current of a write element, for example, using a non-return to zero (NRZ) signal, thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

A common demodulation technique employed in disk drives is known as partial response maximum likelihood (PRML), wherein the recording channel is equalized into a desired partial response (e.g., PR4, EPR4, etc.), the resulting read signal sampled, and the signal samples demodulated using a ML sequence detector. The ML sequence detector is commonly implemented using the well known Viterbi sequence detector which attempts to find the minimum distance sequence (in Euclidean space) through a trellis. The accuracy of a Viterbi sequence detector matches a true ML sequence detector only if the signal noise is time invariant (data independent) and white (statistically independent) with a Gaussian probability distribution. Any deviation of the signal noise due, for example, to miss-equalization, reduces the accuracy of the Viterbi sequence detector.

DETAILED DESCRIPTION

Figure 2A:
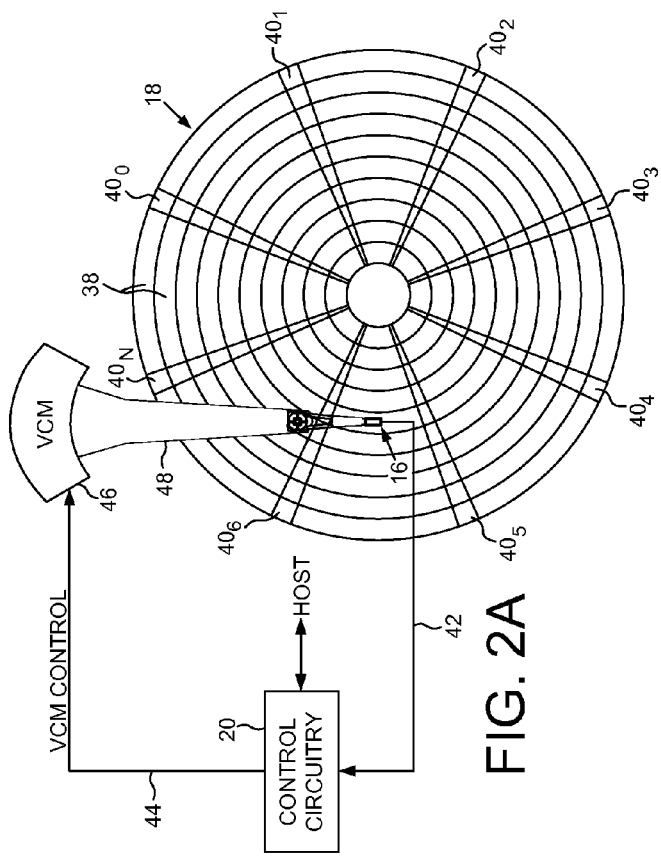
FIG. 2A is a disk drive according to an embodiment of the present invention comprising a head actuated over a disk.
Figure 2B:
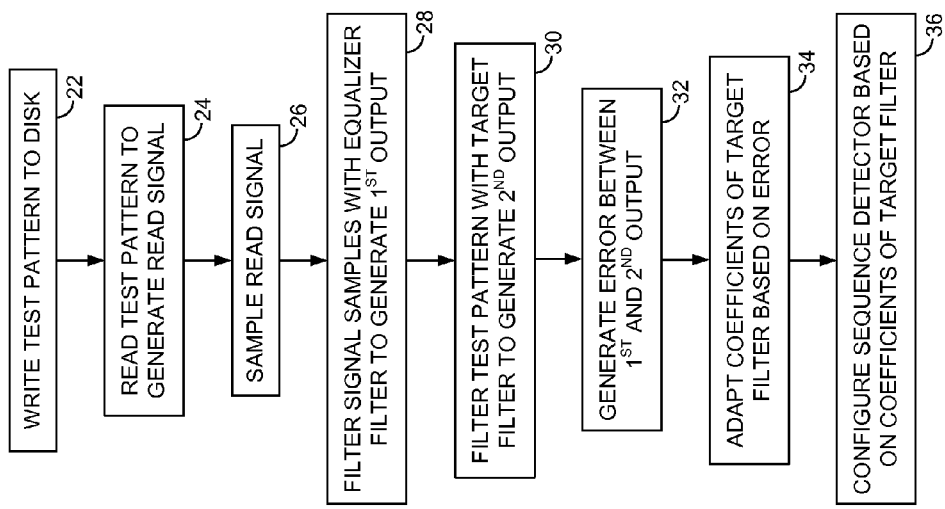
FIG. 2B is a flow diagram according to an embodiment of the present invention wherein coefficients of a target filter are adapted in order to identify an optimal target response for the disk drive.

FIG. 2A shows a disk drive according to an embodiment of the present invention comprising a head 16 actuated over a disk 18, and control circuitry 20 operable to execute the flow diagram of FIG. 2B. A test pattern is written to the disk (block 22) and read from the disk to generate a read signal (block 24). The read signal is sampled to generate signal samples (block 26), the signal samples are filtered with an equalizer filter to generate a first output (block 28), and the test pattern is filtered with a target filter to generate a second output (block 30). An error signal is generated based on a difference between the first output and the second output (block 32), and coefficients of the target filter are adapted in response to the error signal (block 34). After adapting the coefficients of the target filter, a sequence detector is configured based on the coefficients of the target filter (block 36).

Figure 1:
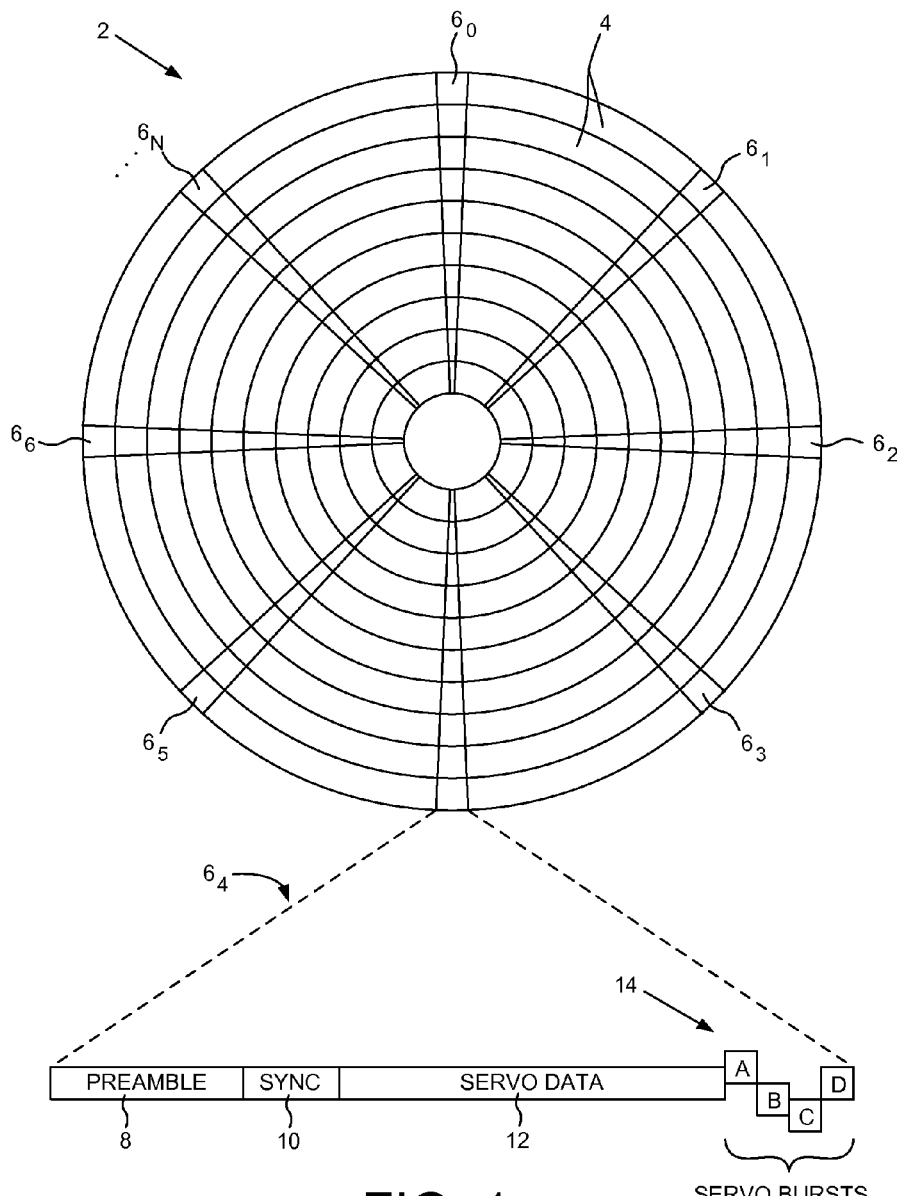
FIG. 1 shows a prior art disk format comprising a plurality of servo tracks defined by servo sectors.

In the embodiment of FIG. 2A, a plurality of concentric servo tracks 38 are defined by embedded servo sectors $40_0$-$40_N$, wherein a plurality of concentric data tracks are defined relative to the servo tracks 38. The control circuitry 20 processes a read signal 42 emanating from the head 16 to demodulate the servo sectors and generate a position error signal (PES) representing an error between the actual position of the head and a target position relative to a target track. The control circuitry 20 filters the PES using a suitable compensation filter to generate a control signal 44 applied to a voice coil motor (VCM) 46 which rotates an actuator arm 48 about a pivot in order to actuate the head 16 radially over the disk 18 in a direction that reduces the PES. The servo sectors may comprise any suitable head position information, such as a track address for coarse positioning and servo bursts for fine positioning. The servo bursts may comprise any suitable pattern, such as an amplitude based servo pattern (FIG. 1) or a phase based servo pattern.

Figure 3A:
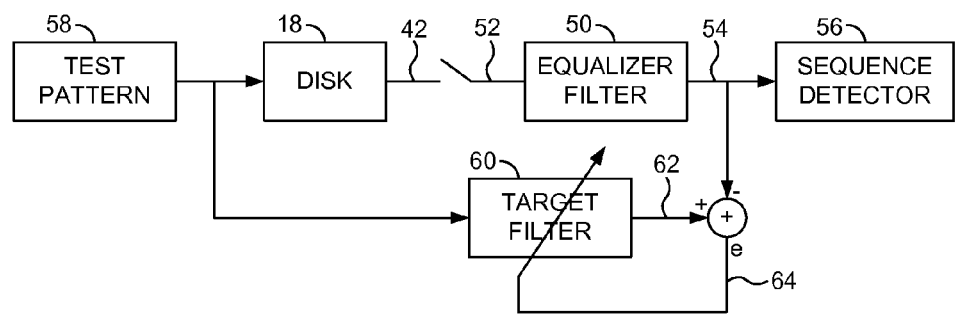
FIG. 3A shows an embodiment of the present invention wherein an output of the target filter is compared to an output of an equalizer filter to generate an error signal used to adapt the coefficients of the target filter.

FIG. 3A shows control circuitry according to an embodiment of the present invention comprising an equalizer filter 50 for equalizing the signal samples 52 according to a target response (e.g., a partial response). In one embodiment, the equalizer filter 50 comprises a plurality of coefficients that implement a finite impulse response (FIR) filter. The equalized samples 54 are processed by a sequence detector 56 which detects an estimated data sequence representing the data recorded on the disk 18. The accuracy of the estimated data sequence depends on the ability of the equalizer filter 50 to filter the signal samples 52 into the target response while minimizing noise amplification (or colorization) in the read signal. In turn, the performance of the equalizer filter 50 is impacted by the target response selected for the sequence detector 56. That is, there is an optimal target response for the read channel (including the disk 18) where the performance of the equalizer filter 50 is maximized, and therefore the performance of the sequence detector 56 is maximized. There is also a tradeoff in the length of the target response and the complexity of the sequence detector 56. Accordingly, in an embodiment of the present invention an optimal target response is determined (for a given length) in order to improve the performance of the equalizer filter 50 and sequence detector 56.

In order to calibrate the target response for the sequence detector 56, in the embodiment of FIG. 3A a test pattern 58 is written to the disk 18 and then read from the disk 18 to generate a read signal 42 that is sampled to generate the signal samples 52. The signal samples 52 are equalized by the equalizer filter 50 configured according to a nominal target response to generate a first output 54. The test pattern 58 is also filtered by a target filter 60 to generate a second output 62. An error signal 64 is generated as the difference between the first output 54 and the second output 62, and the coefficients of the target filter 60 are adapted in response to the error signal 64. In one embodiment, the coefficients of the target filter are adapted using a suitable algorithm that attempts to minimize the error signal 64. In this manner, the coefficients of the target filter 60 represent a close estimate of the combined response of the entire read channel, including the disk 18 and the equalizer filter 50. That is, the coefficients of the target filter 60 are adapted in order to identify the combined response of the read channel. In one embodiment, the response identified by the target filter 60 is used to select the target response for the equalizer filter 50 and the sequence detector 56. For example, in one embodiment the target response is selected to substantially match the response identified by the target filter 60 so as to reduce the equalization required by the equalizer filter 50 (which reduces the amplification and/or colorization of the noise in the read signal).

In one embodiment, the coefficients of the target filter 60 are adapted according to:

$$\frac{\partial}{\partial \hat{h}_i} \sum_n (x[n] - \hat{x}[n])^2$$

where $\hat{h}_i$ represents the coefficients of the target filter, $x[n]$ represents the first output 54, and $\hat{x}[n]$ represents the second output 62. The coefficients of the target filter are adapted until the above equation reaches a minimum. In one embodiment, the solution to the above equation can be derived using a Weiner filter solution for $n=-\infty$ to $+\infty$. In another embodiment, the Wiener filter solution can be simplified to a least mean squares (LMS) solution by considering only the error $e[n]$ for the current signal sample such that the coefficients of the target filter may be updated according to:

$$\hat{h}_i[n+1] = \hat{h}_i[n] + 2\mu(e[n])(s[n-i])$$

where $e[n]$ represents the error signal 64, $s[n-i]$ represents the test pattern 58, and $\mu$ is a step size.

In one embodiment, the number of coefficients in the target filter 60 equals the length of the target response. In another embodiment, the number of coefficients in the target filter 60 is longer than the target response in order to improve the response identified by the target filter 60. After identifying the response of the read channel, the coefficients for the target response may be selected as a best fit match to the coefficients of the target filter 60.

Figure 3B:
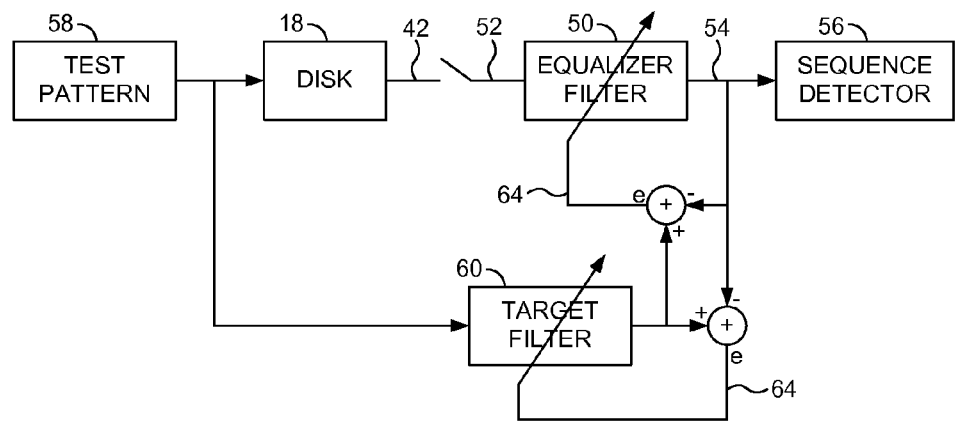
FIG. 3B shows an embodiment of the present invention wherein coefficients of the equalizer filter are adapted prior to adapting the coefficients of the target filter.
Figure 4A:
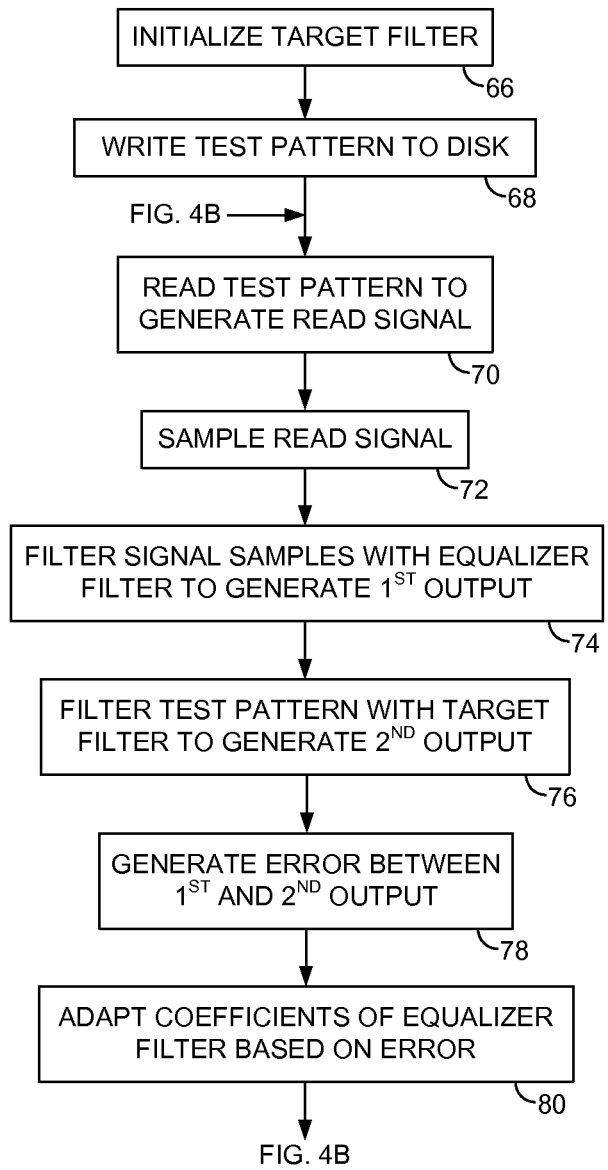
FIGS. 4A and 4B show a flow diagram according to an embodiment of the present invention wherein the process of adapting the coefficients of the equalizer filter and adapting the coefficients of the target filter is iterated until an optimal target response is identified.
Figure 4B:
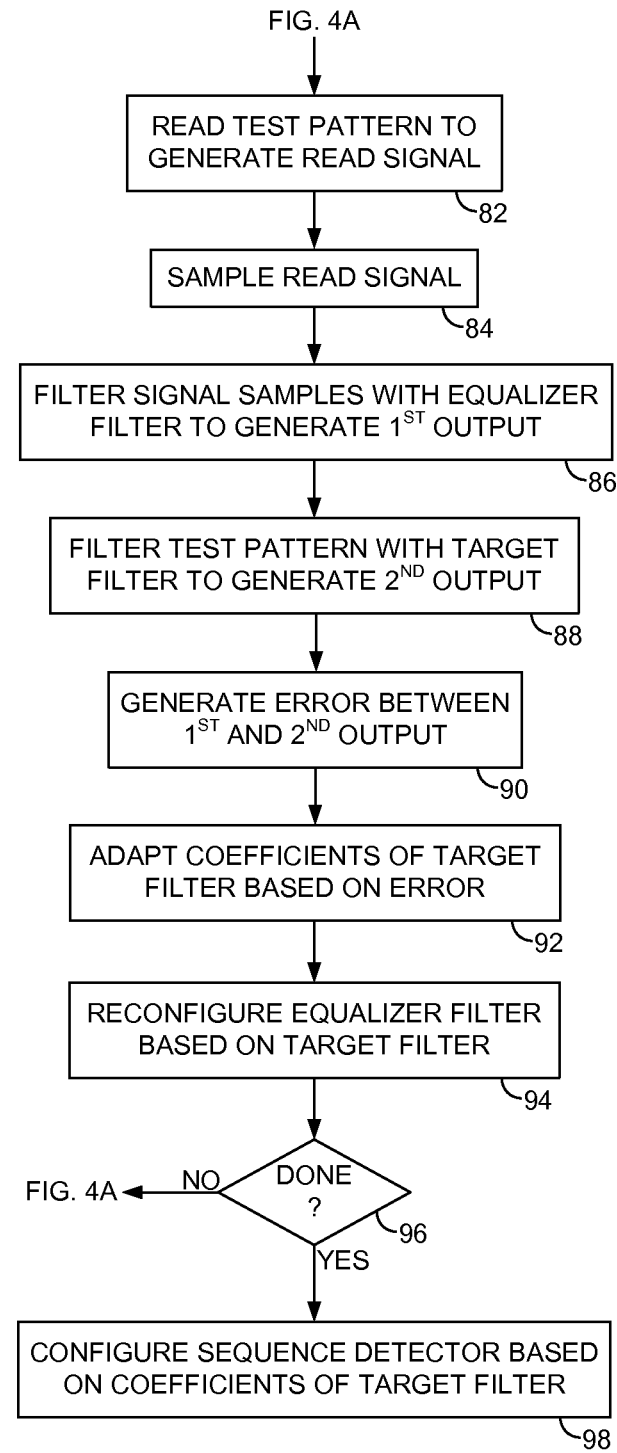

In one embodiment, the control circuitry is further operable to adapt the coefficients of the equalizer filter 50 in response to the error signal 64 prior to adapting the coefficients of the target filter 60. In another embodiment, the coefficients of the equalizer filter 50 are adapted, and then the coefficients of the target filter 60 are adapted in an iterative manner until the coefficients converge to the optimal target response. This embodiment is understood with reference to FIG. 3B and the flow diagram of FIGS. 4A and 4B, wherein the coefficients of the target filter 60 are initialized to a nominal target response (block 66). After writing the test pattern to the disk (block 68), and reading the test pattern (block 70), the read signal is sampled to generate the signal samples (block 72), and the signal samples are equalized by the equalizer filter to generate the first output (block 74). The test pattern is filtered with the target filter to generate the second output (block 76), and an error signal is generated as the difference between the first output and the second output (block 78). The coefficients of the equalizer filter are adapted in a manner that minimizes the error signal (e.g., using the algorithm described above) while the coefficients of the target filter remain fixed (block 80).

After adapting the coefficients of the equalizer filter, the test pattern is read again (block 82), the read signal is sampled to generate the signal samples (block 84), and the signal samples are equalized by the equalizer filter to generate the first output (block 86). The test pattern is filtered with the target filter to generate the second output (block 88), and an error signal is generated as the difference between the first output and the second output (block 90). The coefficients of the target filter are adapted in a manner that minimizes the error signal (e.g., using the algorithm described above) while the coefficients of the equalizer filter remain fixed (block 92). The coefficients of the equalizer filter are then adjusted based on the adapted coefficients of the target filter (block 94); that is, based on the response of the read channel identified by the target filter. This process is then repeated starting at block 70 of FIG. 4A until a suitable metric is satisfied (block 96), such as the coefficients of the target filter settling to within a derivative threshold, or the error signal settling to within a predetermined threshold. The target response for the sequence detector is then configured based on the adapted coefficients of the target filter (block 98).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk; and
   control circuitry operable to:
   write a test pattern to the disk;
   read the test pattern from the disk to generate a read signal;
   sample the read signal to generate signal samples;
   filter the signal samples with an equalizer filter to generate a first output;
   filter the test pattern with a target filter to generate a second output;
   generate an error signal based on a difference between the first output and the second output;
   adapt coefficients of the target filter in response to the error signal;
   after adapting the coefficients of the target filter, configure a sequence detector based on the coefficients of the target filter; and
   adapt the coefficients of the target filter in order to minimize the error signal by minimizing:

$$\frac{\partial}{\partial \hat{h}_i} \sum_n (x[n] - \hat{x}[n])^2$$

where:
   $\hat{h}_i$ represents the coefficients of the target filter;
   x[n] represents the first output; and
   $\hat{x}[n]$ represents the second output.

2. The disk drive as recited in claim 1, wherein the control circuitry is further operable to adapt coefficients of the equalizer filter in response to the error signal prior to adapting the coefficients of the target filter.

3. The disk drive as recited in claim 2, wherein the control circuitry is further operable to adapt coefficients of the equalizer filter in response to the error signal after adapting the coefficients of the target filter.

4. The disk drive as recited in claim 1, wherein the equalizer filter comprises a finite impulse response (FIR) filter.

5. The disk drive as recited in claim 1, wherein the coefficients of the target filter are adapted according to a Wiener filter solution.

6. The disk drive as recited in claim 1, wherein the coefficients of the target filter are adapted according to a least mean squares (LMS) solution.

7. The disk drive as recited in claim 6, wherein the control circuitry is further operable to adapt the coefficients of the target filter according to:

$$\hat{h}_i[n+1] = \hat{h}_i[n] + 2\mu(e[n])(s[n-i])$$

where:
   e[n] represents the error signal;
   s[n−i] represents the test pattern; and
   μ is a step size.

8. The disk drive as recited in claim 1, wherein the sequence detector comprises a trellis sequence detector.

9. The disk drive as recited in claim 8, wherein the sequence detector comprises a Viterbi sequence detector.

10. A method of operating a disk drive, the disk drive comprising a head actuated over a disk, the method comprising:
    writing a test pattern to the disk;
    reading the test pattern from the disk to generate a read signal;
    sampling the read signal to generate signal samples;
    filtering the signal samples with an equalizer filter to generate a first output;
    filtering the test pattern with a target filter to generate a second output;
    generating an error signal based on a difference between the first output and the second output;
    adapting coefficients of the target filter in response to the error signal;
    after adapting the coefficients of the target filter, configuring a sequence detector based on the coefficients of the target filter; and
    adapting the coefficients of the target filter in order to minimize the error signal by minimizing:

$$\frac{\partial}{\partial \hat{h}_i} \sum_n (x[n] - \hat{x}[n])^2$$

where:
    $\hat{h}_i$ represents the coefficients of the target filter;
    x[n] represents the first output; and
    $\hat{x}[n]$ represents the second output.

11. The method as recited in claim 10, further comprising adapting coefficients of the equalizer filter in response to the error signal prior to adapting the coefficients of the target filter.

12. The method as recited in claim 11, further comprising adapting coefficients of the equalizer filter in response to the error signal after adapting the coefficients of the target filter.

13. The method as recited in claim 10, wherein the equalizer filter comprises a finite impulse response (FIR) filter.

14. The method as recited in claim 10, wherein the coefficients of the target filter are adapted according to a Wiener filter solution.

15. The method as recited in claim 10, wherein the coefficients of the target filter are adapted according to a least mean squares (LMS) solution.

16. The method as recited in claim 15, further comprising adapting the coefficients of the target filter according to:

$$\hat{h}_i[n+1] = \hat{h}_i[n] + 2\mu(e[n])(s[n-i])$$

where:
    e[n] represents the error signal;
    s[n−i] represents the test pattern; and
    μ is a step size.

17. The method as recited in claim 10, wherein the sequence detector comprises a trellis sequence detector.

18. The method as recited in claim 17, wherein the sequence detector comprises a Viterbi sequence detector.

* * * * *